United States Patent [19]

Baconnier et al.

[11] 3,969,053
[45] July 13, 1976

[54] DEVICE FOR DISTRIBUTING DYESTUFFS OR OTHER ADDITIONAL MATERIALS IN EXTRUDERS OR THE LIKE

[76] Inventors: Emile Felix Baconnier, Route d'Arlix, 07600 Vals; François Delichères, Quartier des Bastides, 07200 Aubenas, both of France

[22] Filed: Dec. 4, 1974

[21] Appl. No.: 529,506

[30] Foreign Application Priority Data
Dec. 7, 1973   France .............................. 73.43726

[52] U.S. Cl. .............................. 425/132; 425/142; 425/192 R; 425/302 R; 425/309; 425/376
[51] Int. Cl.² .......................................... B29F 3/00
[58] Field of Search ........ 425/142, 244, 132, 131.1, 425/309, 311, 312, 197, 313, 205, 202, 297, 164, 305, 192, 376, 378 R, 379 R; 264/148, 151, 328, 329, 40; 259/191, 192

[56] References Cited
UNITED STATES PATENTS

| 916,827 | 3/1909 | Bangs | 425/313 X |
|---|---|---|---|
| 1,987,359 | 1/1935 | Brown | 425/202 |
| 2,257,067 | 9/1941 | Parsons | 425/197 X |
| 2,649,618 | 8/1953 | Rhodes et al. | 425/142 X |
| 3,212,461 | 10/1965 | Fritzberg | 425/142 |
| 3,497,914 | 3/1970 | Tybout | 425/131.1 |
| 3,609,828 | 10/1971 | Compa et al. | 425/205 X |
| 3,672,803 | 6/1972 | Rees | 425/202 X |
| 3,698,845 | 10/1972 | Paulson | 425/244 X |

Primary Examiner—Francis S. Husar
Assistant Examiner—Mark Rosenbaum
Attorney, Agent, or Firm—Staas & Halsey

[57] ABSTRACT

Device for distributing dyestuffs or other additional materials in an extruding machine, the dyestuff material being contained in a kind of removable and interchangeable cartridge that is fixed to the feed chute of the extruding machine. The cartridge is provided with means for pressing said material and a dosing member for controlling the feed of material into the machine.

8 Claims, 8 Drawing Figures

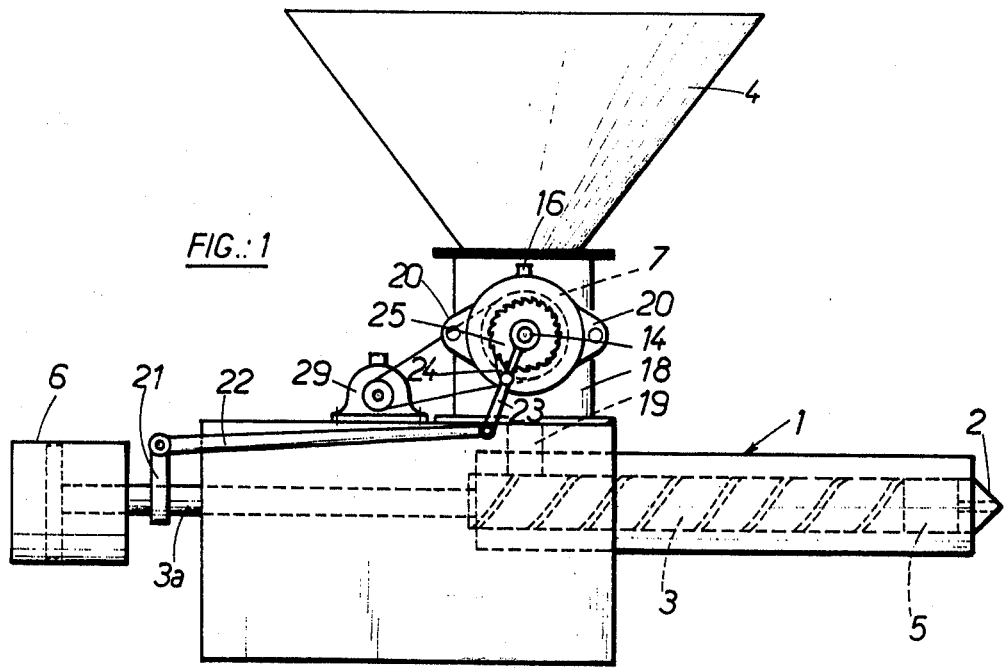
FIG.:1
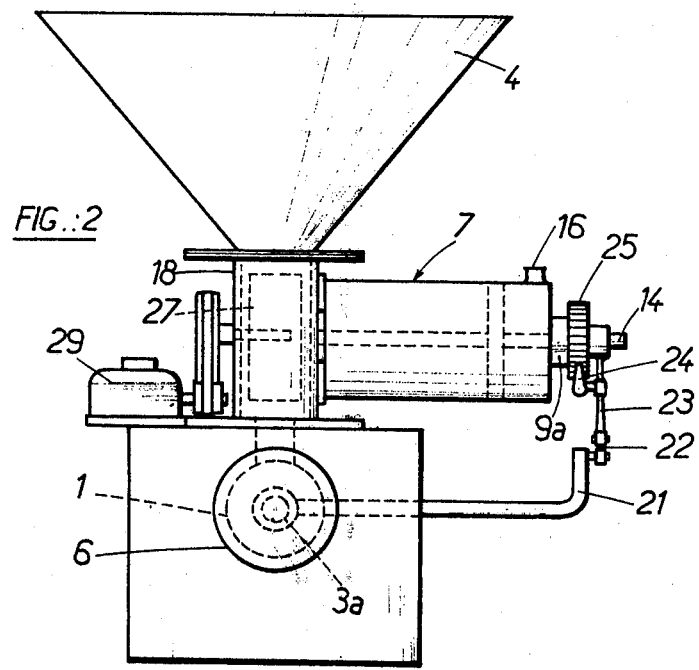
FIG.:2

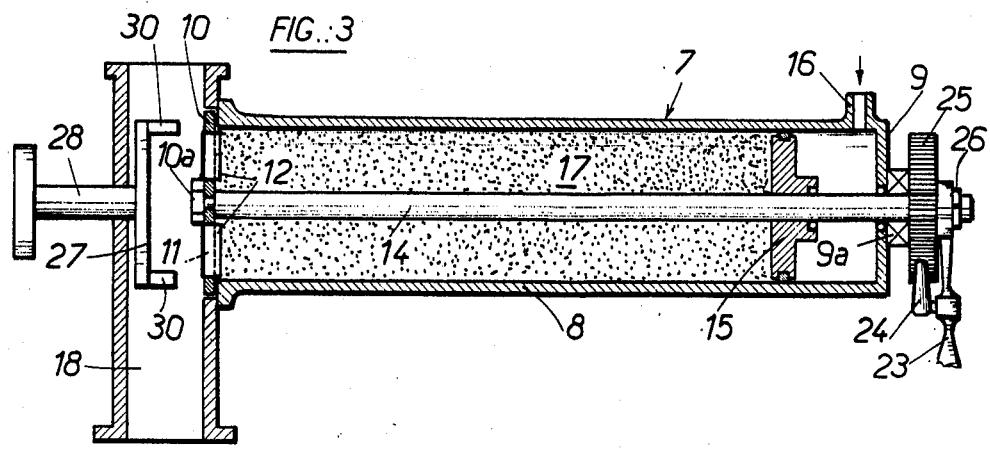
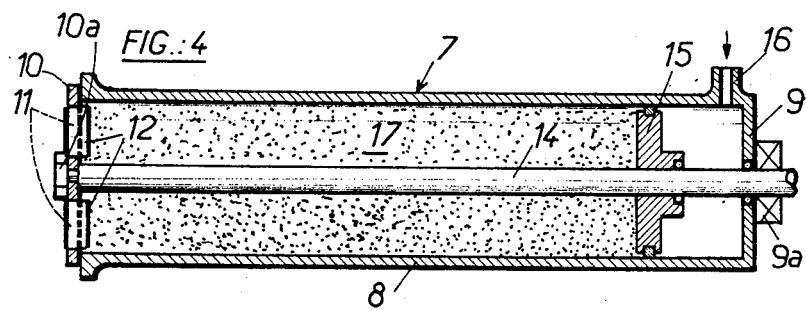
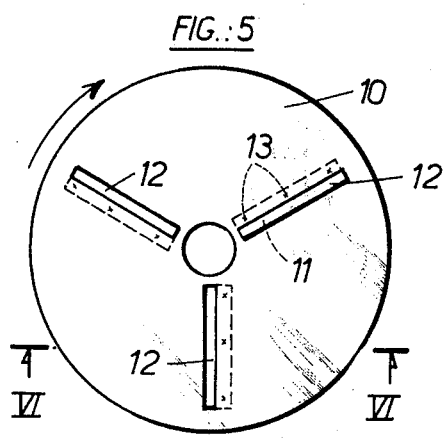
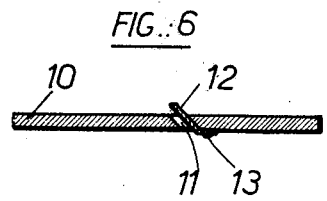

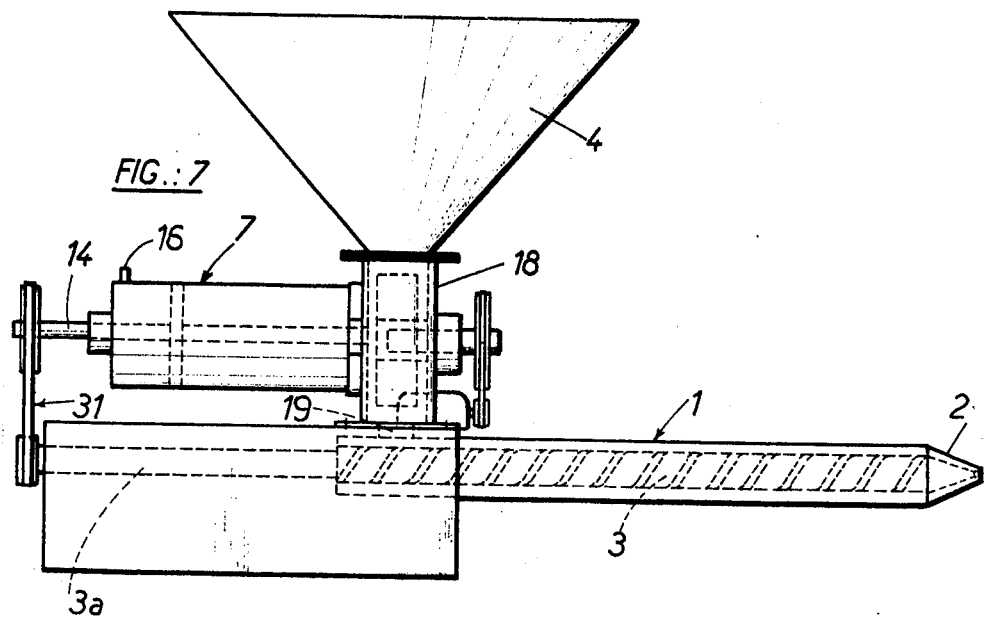
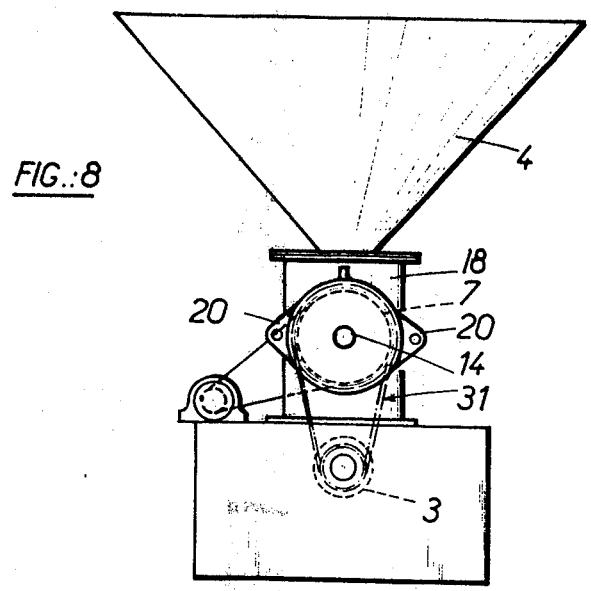

DEVICE FOR DISTRIBUTING DYESTUFFS OR OTHER ADDITIONAL MATERIALS IN EXTRUDERS OR THE LIKE

SUMMARY OF THE INVENTION

The addition of dyestuffs to plastic charges that feed extruders, extruding presses and the like raises a problem which was unsatisfactorily solved until now.

On the one hand the dyestuffs have to be in an appropriate proportion with respect to the mass of plastic material and this proportion is generally very small. On the other hand, when dyestuffs are to be changed, it is necessary to employ the utmost care in cleaning out the hoppers and channels previously used for mixing the charge and dyestuff together. This cleaning involves an elaborate operation and brings the machine to a standstill for a long period of time.

The instant invention has for its main object to provide a device for distributing dyestuffs and to solve the above mentioned problem in an advantageous and comparatively simple way.

The main constituent of this device is made up of cartridges which can be fixed in a removable and interchangeable manner in the feed channel of the extruder or press, suitably adapted to this end, each of the cartridges contains a different dyestuff; thus, for exchanging the coloring substance, it suffices to remove the cartridge then in position and to replace it by another one of appropriate coloration.

Every one of the cartridges comprises means for pressing the colored, generally pulverulent, mass it contains. On the side facing its attachment onto the machine, a moving dosing-member is provided such as a disk with cutters or scraping means which by rotation cuts out or removes a part of the compressed coloring mass for introducing it into the mass of the material delivered by the hopper. The shaft of the rotatable cutter or scraping member protrudes outwardly of the cartridge in order to be driven in rotation by a member of the machine or even by a separate motor.

Preferably, the channel, which receives the charge of the hopper and the cut fragments of dyestuff, is provided with a rotating agitator for mixing the charge and the dyestuff together prior to their introduction into the machine cylinder.

BRIEF DESCRIPTION OF THE DRAWINGS

The appended drawings show some exemplifying embodiments of the invention.

FIG. 1 shows diagrammatically an extruding press with a distributor according to the present invention, wherein the press is represented in projection onto a vertical plane that is parallel with the operating worm-screw of the press.

FIG. 2 shows the same press seen in projection on a vertical plane perpendicular to the plane of the worm-screw.

FIG. 3 shows an enlarged section of a distributor cartridge connected to the chute of the hopper.

FIG. 4 shows a cross-sectional view of the distributor cartridge.

FIG. 5 shows the rotatable cutting disk of the distributor cartridge and

FIG. 6 is a cross-sectional view along VI—VI of the rotatable cutting disk shown in FIG. 5.

FIGS. 7 and 8 are views analogous to FIGS. 1 and 2 for showing a continuous extruder provided with the distributor according to the invention.

DETAILED DESCRIPTION OF THE INVENTION

In FIG. 1 the extruding press represented comprises a cylinder 1 that opens outwards through a die 2 and contains in a known manner an extruding, revolving worm-screw 3. As it is known, this worm-screw, supported in the cylinder and having the capacity for sliding with respect thereto in a direction parallel to its geometric axis, accumulates the plastic material which is delivered in the form of granules from the hopper 4 towards the die 2 into volume 5. At the same time the worm-screw slides back in the cylinder (i.e. from right to left in FIG. 1) as the volume 5 grows; after a certain amount of repulsion, the worm-screw is propelled in translation along the axis in the direction of the die 2, by means of a compressed air or hydraulic motor, so as to become a piston that ejects the plastic material of volume 5 through the die 2.

According to the invention a distributor 7 of a dyestuff or other additional material is incorporated in such a press. Embodiments of this distributor are shown in FIGS. 3–6. This distributor includes a tube 8 closed at one end 9 and containing a disk 10 at the other end. Said disk 10 presents radial slots 11 (see FIGS. 5 and 6) each of which has a limiting surface that receives a cutting or scraping blade 12 projecting beyond the inner face of the disk. The cutting or scraping blades 12 can be fixed by such means as screws 13, which permit an easy detachment for replacing the blades. The disk 10, thus fitted, is fixed by a nut 10a at the end of a shaft 14 located along the axis of tube 8. The shaft passes through the end wall 9 and a bearing 9a at the exterior of tube 8, for imparting a revolving motion which is transmitted to disk 10. A piston 15 is shown that slides on shaft 14 and reacts to the pressure of a fluid (for instance compressed air) delivered by a nozzle 16. The piston 15 is used for compressing the material 17, i.e. some pulverulent dyestuff, contained in tube 8.

At its end, where the disk 10 is included, tube 8 is supplemented with means for fixing it, together with its adjoining parts just described, onto one side of the chute 18 fitted on the base of hopper 4, between hopper 4 and the feed channel 19 of the worm-screw 3, said side being apertured with a circular opening about which tube 8 is to be centered. Fixation is obtained in such a way that tube 8 may be easily dismounted from the chute, so that it may be replaced by another which contains a different dyestuff or additional material. To this end, for instance, the tube 8 may comprise two lugs 20 (FIG. 1) that are fixed by means of screws or bolts to chute 18.

When tube 8 is thus attached to chute 18, a rotation of the shaft 14 and the disk 10 produces the scraping by the blades 12 of the material 17 and the falling off of a certain quantity of this material through the apertures 11, and down in the chute 18. The dose of dyestuff or other additional material thus entering the chute for being added to the plastic charge delivered by hopper 4 depends on the value of the rotation angle of shaft 14 and disk 10. Thus it is important to have this angle related to the rotation angle of worm-screw 3, which itself governs the quantity of plastic material extruded from volume 5.

To this end, in the embodiment of FIGS. 1 and 2, actuation of shaft 14 is determined by the backing movement of worm-screw 3, since the backing displacement of worm-screw 3 is itself proportional to volume 5.

The shaft 3a of this worm-screw (whose driving arrangement is not illustrated) is provided with an arm 21 in such manner that shaft 3a may rotate relatively thereto, but is carried along in translation together with it. This arm 21 is linked by a connecting rod or bar 22 to an arm 23, that freely pivots about the distributor shaft 24 and is provided with a pivoting pawl 24 cooperating with a ratchet wheel 25 keyed on shaft 14.

The teeth of the ratchet wheel are oriented in such a way that during translation of the worm-screw 3 from right to left in FIG. 1, that is to say during feeding-in of volume 5, the pawl 24 drives the ratchet wheel 25 and consequently shaft 14 together with disk 10, whereas in the left-to-right movement of worm-screw 3 producing ejection of the material, pawl 24 hops over the teeth and shaft 14 is not actuated for its rotation.

The joints of the connecting rod 22, or those of the arm 23 with the pawl 24 and the ratchet wheel 25 are constructed so as to be easily dismantled. Thus they may be separated from the shaft 14 of a distributor tube 8 when it is desired to replace the latter by another one containing a different dyestuff. A slotted ring or a nut 26 retains the ratchet wheel 25 and the arm 23 in position when the distributor tube is fixed to the hopper chute.

It should be noted that this arrangement of removable and interchangeable distributor tubes in the form of cartridges is advantageous since quick exchange of dyestuffs or additional materials can be achieved while the problems of the previously known arrangements are circumvented.

A small mixer, for ensuring a good distribution of the dyestuff in the plastic charge issuing from the hopper, may be fitted to the chute 18. This mixer may comprise, for example, a disk 27 mounted on a rotatable shaft 28 passing through the wall of the hopper chute 18, in alignment with shaft 14, and actuated by a small electric motor 29 (FIG. 1) through an endless chain or belt, or other equivalent means.

The disk 27 has a certain number of studs 30 arranged perpendicularly to its surface, which stir the mixture of plastic material and dyestuff so as to obtain a desired homogeneity.

The FIGS. 7 and 8 relate to the application of the invention to a continuous extruder, i.e. a machine in which the extruding worm-screw presents only a revolving motion for the plastic material issuing from hopper 4 extruding through die 2, by virtue of this continuously revolving motion.

In this case, the shaft 14 of tube 8 that contains the additional filler being arranged and fixed as described above, is continuously driven by the shaft 3a of worm-screw 3, being rotated through a chain or belt or like transmission having a reduction ratio suitably chosen for proportioning the rate of flow of dyestuff evacuated from tube 8 to the rate of flow of plastic material delivered by worm-screw 3.

It goes without saying that the embodiments described hereabove are only examples and in no way limit the scope of the invention as defined by the appended claims.

We claim:

1. In combination with an extruding machine having a screw extruder and a chute for feeding material to said screw extruder, wherein said chute being provided with a lateral aperture; a device for adding an additional substance in a pulverulent state to said material, said device comprising a cylindrical cartridge container for a mass of the said additional substance; means at one end of said container for securing it in a removable manner to said chute in register with said aperture; rotatable scraping means at the same end of said container for progressively removing a portion of said mass allowing said removed portion to fall into said chute; means in said container including a pressure actuated piston for pushing said mass towards said scraping means; means for rotating said scraping means; and transmission means between said screw extruder and said rotating means for communicating to said scraping means a rotational movement proportional to the axial movement of the extruder screw.

2. The combination of claim 1, wherein said means for rotating said scraping means comprises a shaft mounted in said container coaxially therewith and passing through said mass, said pressure actuated piston being annular and sliding along said shaft.

3. The combination of claim 1, wherein said scraping means comprises a rotatable disk mounted at said one end of said container, provided with radial slots and scraping blades connected in said slots for scraping said mass and urging said removed portion through said slots and into said chute.

4. The combination of claim 1, further comprising mixer means mounted in said chute in front of said lateral aperture.

5. The combination of claim 1, wherein said screw extruder comprises a die and a translation movable extruder screw which moves away from said die while rotating for accumulating the material to be extruded behind said die and then moving back towards said die for expelling said accumulated material through the die, said transmission means being adapted to rotate said scraping means only when said extruder screw is moving away from the die.

6. The combination of claim 5 wherein said transmission means includes a ratchet wheel containing ratchet teeth connected to said scraping means, a pawl, an arm carrying said pawl and means for rotating said arm during translation of said extruder screw, the orientation of the ratchet teeth being such that the scraping means is driven only during the movement of the screw away from said die.

7. The combination of claim 6, wherein said scraping means comprises a rotatable disk mounted at said one end of said container and provided with radial slots and scraper blades connected in said slots for scraping said mass and urging said removed portion through said slots and into said chute, said means for rotating said scraping means comprises a shaft mounted in said container coaxially therewith and passing through said mass, said pressure actuated piston being annular and sliding along said shaft, said rotatable disk and said ratchet wheel being secured to said shaft.

8. The combination of claim 7, further comprising mixer means located in said chute in front of said lateral aperture.

* * * * *